(12) United States Patent
Lim et al.

(10) Patent No.: US 7,961,061 B2
(45) Date of Patent: Jun. 14, 2011

(54) APPARATUS AND METHOD FOR MODULATION AND DEMODULATION USING FREQUENCY SELECTIVE BASEBAND

(75) Inventors: In Gi Lim, Daejeon (KR); Hyung Il Park, Daejeon (KR); Sung Weon Kang, Daejeon (KR); Tae Wook Kang, Daejeon (KR); Chang Hee Hyoung, Daejeon (KR); Jung Hwan Hwang, Daejeon (KR); Kyung Soo Kim, Daejeon (KR); Jung Bum Kim, Daejeon (KR); Duck Gun Park, Daejeon (KR); Jin Kyung Kim, Daejeon (KR); Sung Eun Kim, Seoul (KR); Ki Hyuk Park, Daejeon (KR); Jae Hoon Shim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/601,584

(22) PCT Filed: Apr. 11, 2008

(86) PCT No.: PCT/KR2008/002036
§ 371 (c)(1),
(2), (4) Date: Nov. 24, 2009

(87) PCT Pub. No.: WO2009/002009
PCT Pub. Date: Dec. 31, 2008

(65) Prior Publication Data
US 2010/0171562 A1 Jul. 8, 2010

(30) Foreign Application Priority Data

Jun. 26, 2007 (KR) .......... 10-2007-0062895
Aug. 30, 2007 (KR) .......... 10-2007-0087869

(51) Int. Cl.
*H03C 3/00* (2006.01)
*H03D 3/00* (2006.01)
*H04B 1/00* (2006.01)

(52) U.S. Cl. ......... 332/117; 329/315; 375/146; 375/147
(58) Field of Classification Search ................. 332/117; 329/315; 375/146, 147
See application file for complete search history.

(56) References Cited

U.S. PATENT DOCUMENTS 6,795,488 B1 * 9/2004 Iwakiri .......................... 375/148
(Continued)

FOREIGN PATENT DOCUMENTS

JP    2007-036439    2/2007
(Continued)

OTHER PUBLICATIONS

T. G. Zimmerman, "Personal Area Networks: Near-field intrabody communication", IBM System Journal, 1996, pp. 609-617, vol. 35, Nos. 3 & 4.

(Continued)

*Primary Examiner* — David Mis

(57) ABSTRACT

Provided are modulation and demodulation methods and apparatuses using a frequency selective baseband. The frequency modulation method includes: generating a plurality of subgroups by dividing 2N (N is a real number) spread codes used for frequency spreading into 2M (M<N, M is a real number) spread codes; selecting P(P is a real number) subgroups among the generated subgroups; acquiring P spread codes by inputting M data bits to each of the p subgroups so as for 1 spread code to be selected among the 2M spread codes of each subgroup; and selecting dominant value among the acquired P spread codes to generate transmitting data including the dominant value. Accordingly, it is possible to increase a processing gain of the entire system, to increase a transmission data rate, and to reduce power consumption of the system.

13 Claims, 8 Drawing Sheets

U.S. PATENT DOCUMENTS

| | | |
|---|---|---|
| 7,171,177 B2 | 1/2007 | Park et al. |
| 2002/0054619 A1 | 5/2002 | Haas |
| 2004/0042530 A1 | 3/2004 | Ryu |
| 2006/0234647 A1 | 10/2006 | Kerselaers |

FOREIGN PATENT DOCUMENTS

| | | |
|---|---|---|
| KR | 10-2005-0078578 A | 8/2005 |
| KR | 100829865 B1 | 5/2008 |
| KR | 100835175 B2 | 5/2008 |

OTHER PUBLICATIONS

International Search Report for PCT/KR2008/002036 filed Apr. 11, 2008.

Written Opinion of the International Searching Authority for PCT/KR2008/002036 filed Apr. 11, 2008.

* cited by examiner

SUBGROUP 0 (W0~W15)

| | |
|---|---|
| W0 | 0000000000000000000000000000000000000000000000000000000000000000 |
| W1 | 0000000000000000000000000000000011111111111111111111111111111111 |
| W2 | 0000000000000000111111111111111111111111111111110000000000000000 |
| W3 | 0000000000000000111111111111111100000000000000001111111111111111 |
| W4 | 0000000011111111111111110000000000000000111111111111111100000000 |
| W5 | 0000000011111111111111110000000011111111000000000000000011111111 |
| W6 | 0000000011111111000000001111111111111111000000000000000000000000 |
| W7 | 0000000011111111000000001111111100000000111111110000000011111111 |
| W8 | 0000111111110000000011111111000000001111111100000000111111110000 |
| W9 | 0000111111110000000011111111000011110000000011111111000000001111 |
| W10 | 0000111111110000111100000000111111110000000011110000111111110000 |
| W11 | 0000111111110000111100000000111100001111111100001111000000001111 |
| W12 | 0000111100001111111100001111000000001111000011110000111100001100 |
| W13 | 0000111100001111111100001111000011110000111100000000111100001111 |
| W14 | 0000111100001111000011110000111111110000111100001111000011110000 |
| W15 | 0000111100001111000011110000111100001111000011110000111100001111 |

SUBGROUP 1 (W16~W31)

| | |
|---|---|
| W16 | 0011110000111100001111000011110000111100001111000011110000111100 |
| W17 | 0011110000111100001111000011110011000011110000111100001111000011 |
| W18 | 0011110000111100110000111100001111000011110000111100001111000011 |
| W19 | 0011110000111100110000111100001100111100001111001100001111000011 |
| W20 | 0011110011000011110000110011110000111100110000111100001100111100 |
| W21 | 0011110011000011110000110011110011000011001111000011110011000011 |
| W22 | 0011110011000011001111001100001111000011001111001100001100111100 |
| W23 | 0011110011000011001111001100001100111100110000110011110011000011 |
| W24 | 0011001111001100001100111100110000110011110011000011001111001100 |
| W25 | 0011001111001100001100111100110011001100001100111100110000110011 |
| W26 | 0011001111001100110011000011001111001100001100110011001111001100 |
| W27 | 0011001111001100110011000011001100110011110011001100110011000011 |
| W28 | 0011001100110011110011001100110000110011001100111100110011001100 |
| W29 | 0011001100110011110011001100110011001100110000110011001100110011 |
| W30 | 0011001100110011001100110011001111001100110011001100110011001100 |
| W31 | 0011001100110011001100110011001100110011001100110011001100110011 |

SUBGROUP 2 (W32~W47)

| | |
|---|---|
| W32 | 0110011001100110011001100110011001100110011001100110011001100110 |
| W33 | 0110011001100110011001100110011010011001100110011001100110011001 |
| W34 | 0110011001100110100110011001100110011001100110011001100110100110 |
| W35 | 0110011001100110100110011001100110011001100110011001100110011001 |
| W36 | 0110011010011001100110010110011001100110100110011001100101100110 |
| W37 | 0110011010011001100110010110011010011001100101100110011001100110 |
| W38 | 0110011010011001101100110110011001100110010110011010011001100110 |
| W39 | 0110011010011001101100110110011001100110010110011010011010011001 |
| W40 | 0110100110011001100110010110011001100110100110011001100110011001 |
| W41 | 0110100110010110011010011001101010011010010110010110010110011001 |
| W42 | 0110100110010110100101101101001001100101100110100101101001100110 |
| W43 | 0110100110010110100101101101001001100101100101101001011010011001 |
| W44 | 0110100101101001100110110100101101101001011010011001011010010110 |
| W45 | 0110100101101001100110110100101001100101001010010110100101101001 |
| W46 | 0110100101101001001110010110100110010110100101101001010110010110 |
| W47 | 0110100101101001011010010110100101101001011010010110100101101001 |

SUBGROUP 3 (W48~W63)

| | |
|---|---|
| W48 | 0101101001011010010110100101101001011010010110100101101001011010 |
| W49 | 0101101001011010010110100101101010100101101001011010010110100101 |
| W50 | 0101101001011010101001011010010110100101101001010101101001011010 |
| W51 | 0101101001011010101001011010010110100101010110100101001010110101 |
| W52 | 0101101010100101101001011010010110100101010110100101001010101101 |
| W53 | 0101101010100101101001011010101010010101010110100101101010100101 |
| W54 | 0101101010100101010110101010010110100101010110101010010101011010 |
| W55 | 0101101010100101010110101010010110101010010101011010101010100101 |
| W56 | 0101010110101010010101011010101001010101101010100101011010101010 |
| W57 | 0101010110101010010101011010101001010101101010101010010100101011 |
| W58 | 0101010110101010101001010101011010101001010101010101010110101010 |
| W59 | 0101010110101010101010101001010101010110101010101010101001010101 |
| W60 | 0101010101010110101010101010010101010101010110101010101010101010 |
| W61 | 0101010101010110101010101010101010101010101010101010101010101010 |
| W62 | 0101010101010101010101010101101010101010101010101010101010101010 |
| W63 | 0101010101010101010101010101010101010101010101010101010101010101 |

FIG. 2

APPARATUS AND METHOD FOR MODULATION AND DEMODULATION USING FREQUENCY SELECTIVE BASEBAND

TECHNICAL FIELD

The present invention relates to modulation and demodulation methods and apparatuses using a frequency selective baseband, and more particularly, to modulation and demodulation methods and apparatuses using a frequency selective baseband, capable of reducing power consumption in data transmission and increasing a transmission data rate by using a limited frequency band where an power of internal-human-body transmitting signal propagating through a human body as a waveguide is lager than that of an external-human-body radiating signal, and excluding a frequency band of DC to 5 MHz where noise power near the human body is concentrated.

The work related to the present invention was partly supported by the IT R&D program of MIC/IITA [2006-S-072-02, Human-body Communication Controller SoC].

BACKGROUND ART

Human-body communication is a technique for transmitting signals between apparatus connected to a human body by using the human body having conductivity as a communication channel. In the human-body communication technique, a communication network to various portable apparatuses such as personal digital assistants (PDAs), portable personal computers, digital cameras, MP3 players, and mobile phones or a communication network to fixed-type apparatuses such as printers, TVs, and entrance systems can be implemented by a user simply contacting the apparatuses.

An existing human-body communication methods, there have been proposed a method using a limited passband, a method using scrambling with user's unique ID, a method of using channel coding, a method using interleaving, a method using spreading, and the like.

In the existing human-body communication method, a passband having a central frequency fc which is used for most communication systems needs to be used in order to use the limited frequency band. Therefore, a digital-to-analog converter, an analog-to-digital converter, a central frequency converter, and the like needs to be provided to analog transmission and reception stages. Accordingly, the existing human-body communication methods have a problem in terms of low power consumption.

In addition, recently, a human-body communication method using a time-domain/frequency-domain spreading scheme for increasing a processing gain has been proposed. However, due to a limited frequency band, the human-body communication method has a problem in terms of increase in transmission data rate and efficiency of stable data communication.

DISCLOSURE OF INVENTION

Technical Problem

The present invention provides modulation and demodulation methods and apparatuses using a frequency selective baseband in digital communication, particularly, in human-body communication, capable of implementing low power consumption and increasing a transmission data rate.

Technical Solution

According to an aspect of the present invention, there is provided a frequency modulation method using a frequency selective baseband, comprising: generating a plurality of sub-groups by dividing 2N (N is a real number) spread codes used for frequency spreading into 2M (M<N, M is a real number) spread codes; selecting P(P is a real number) subgroups selected by a user among the generated subgroups; acquiring P spread codes by inputting M data bits to each of the selected p subgroups so as for one spread code to be selected among the 2M spread codes of each subgroup; and selecting dominant value among the acquired P spread codes and generating transmitting data including the dominant value.

In the above aspect of the present invention, the frequency modulation method may further comprise converting serial data provided from an upper layer to P*M-bit parallel data, wherein the M parallel data bits are inputted to each of the selected P subgroups.

In addition, The frequency modulation method may further comprise converting serial data provided from an upper layer to (P*M+1)-bit parallel data; and generating transmitting data by performing an XOR operation on the dominant value selected from the P spread codes acquired from the subgroups and one bit of the (P*M+1) bits.

In addition, in the selecting of the dominant value among the acquired P spread codes, an AND operation is performed on groups of two spread codes among the acquired P spread codes, an OR operation is performed on the resulting values of the AND operation, and only the most significant bit is selected from the resulting values of the OR operation for the P spread codes.

According to another aspect of the present invention, there is provided a frequency demodulation method using a frequency selective baseband, comprising: generating a plurality of subgroups by dividing 2N (N is a real number) spread codes used for frequency spreading into 2M (M<N, M is a real number) spread codes; when modulated data are transmitted from a transmitting stage, acquiring frame synchronization and timing synchronization from the transmitting data; selecting P subgroups used for modulation of the transmitting data among the plurality of subgroups and synchronizing the spread codes of the selected subgroups with the frame synchronization and the timing synchronization; calculating correlation values between the spread codes of the P subgroups and the transmitting data and detecting one spread code selected for the modulation from each of the subgroups; generating an M-bit index value of the detected spread code of each of the P subgroups to obtain M*P-bit parallel data; and converting the M*P-bit parallel data to serial data.

In the above aspect of the present invention, the frequency demodulation method may further comprise: acquiring 1-bit data according to the correlation values of the index values generated the individual P subgroups; and obtaining parallel data by adding the acquired 1-bit data and the M*P index values acquired from the P subgroups and converting the parallel data to the serial data.

According to still another aspect of the present invention, there is provided a frequency modulation apparatus using a frequency selective baseband, comprising: a plurality of sub-frequency selective spreaders each including one subgroup among a plurality of subgroups generated by dividing 2N (N is a real number) spread codes used for frequency spreading into 2M (M<N, M is a real number) spread codes, selecting and outputting one spread code among the 2M spread code of the corresponding subgroup when M data bits are inputted; and a serial-to-parallel conversion unit converting serial data provided from an upper layer to P*M-bit parallel data, outputting the M data bits to each of the P sub-frequency selective spreaders selected among the plurality of sub-frequency selective spreaders; a dominant-value selection unit selecting dominant value from P spread codes outputted from the P sub-frequency selective spreaders and generating transmitting data including the dominant value.

In the above aspect of the present invention, the serial-to-parallel conversion unit may convert the serial data provided from the upper layer to (P*M+1)-bit parallel data, output M data bits to each of the selected P sub-frequency selective spreaders, and output one bit in separation from the P*M bits.

In addition, the frequency modulation apparatus may further comprise an XOR logic circuit performing an XOR operation on the dominant value selected by the dominant-value selection unit and the 1 bit separately outputted from the serial-to-parallel conversion unit so as to increase a transmission data rate.

In addition, the dominant-value selection unit may perform an AND operation on groups of two spread codes among the selected P spread codes, perform an OR operation on the resulting values of the AND operations, and select only the most significant bit from the resulting values of the OR operation for the P spread codes.

According to further still another aspect of the present invention, there is provided a frequency demodulation apparatus using a frequency selective baseband, comprising: a orthogonal code generator generating a plurality of subgroups by dividing 2N (N is a real number) spread codes used for frequency spreading into 2M (M<N, M is a real number) spread codes, acquiring frame synchronization and timing synchronization from transmitting data when a modulated data is transmitted from a transmitting stage, selecting P subgroups determined to be used for modulation of the transmitting data among the plurality of subgroups, and synchronizing and outputting the spread codes of the P subgroups with the acquired frame synchronization and timing synchronization; a plurality of sub-frequency selective despreaders each receiving, in a case where the modulated transmitting data is received from the transmitting stage, 2M spread codes from the orthogonal code generator, calculating correlation values between the provided spread codes and the transmitting data, detecting one spread code determined to be selected for the modulation of the transmitting data, and outputting an M-bit index value of the detected spread code; and a parallel-to-serial conversion unit converting P*M index values of parallel data inputted from the P sub-frequency selective despreaders which are provided with the spread codes of the P subgroups from orthogonal code generator to serial data.

In the above aspect of the present invention, the frequency demodulation apparatus may further comprise a correlation value determination unit provided with the correlation values of the index values outputted from the P sub-frequency selective despreaders and outputting different 1-bit data according to the provided correlation values.

In addition, in a case where 1-bit data outputted from the correlation value determination unit together with the P*M-bit parallel data outputted from the sub-frequency selective despreaders are inputted, the parallel-to-serial conversion unit may convert parallel data obtained by adding the P*M index values and the 1-bit data to the serial data.

Advantageous Effects

According to modulation and demodulation methods and apparatuses using a frequency selective baseband of the present invention, it is possible to increase a processing gain of an entire system and to increase a transmission data rate by using serial-to-parallel conversion, frequency selective baseband transmission, and the limited number of spread codes in a digital communication.

In addition, according to modulation and demodulation methods and apparatuses using a frequency selective baseband of the present invention, a configuration of analog transmitting and receiving stages can be minimized by using a frequency selective baseband transmission scheme, so that it is possible to reduce power consumption of an entire digital communication system.

BRIEF DESCRIPTION OF THE DRAWINGS

FIG. 2 is a view illustrating subgroups of 64 Walsh codes according to an embodiment of the present invention.

BEST MODE FOR CARRYING OUT THE INVENTION

Figure 1:
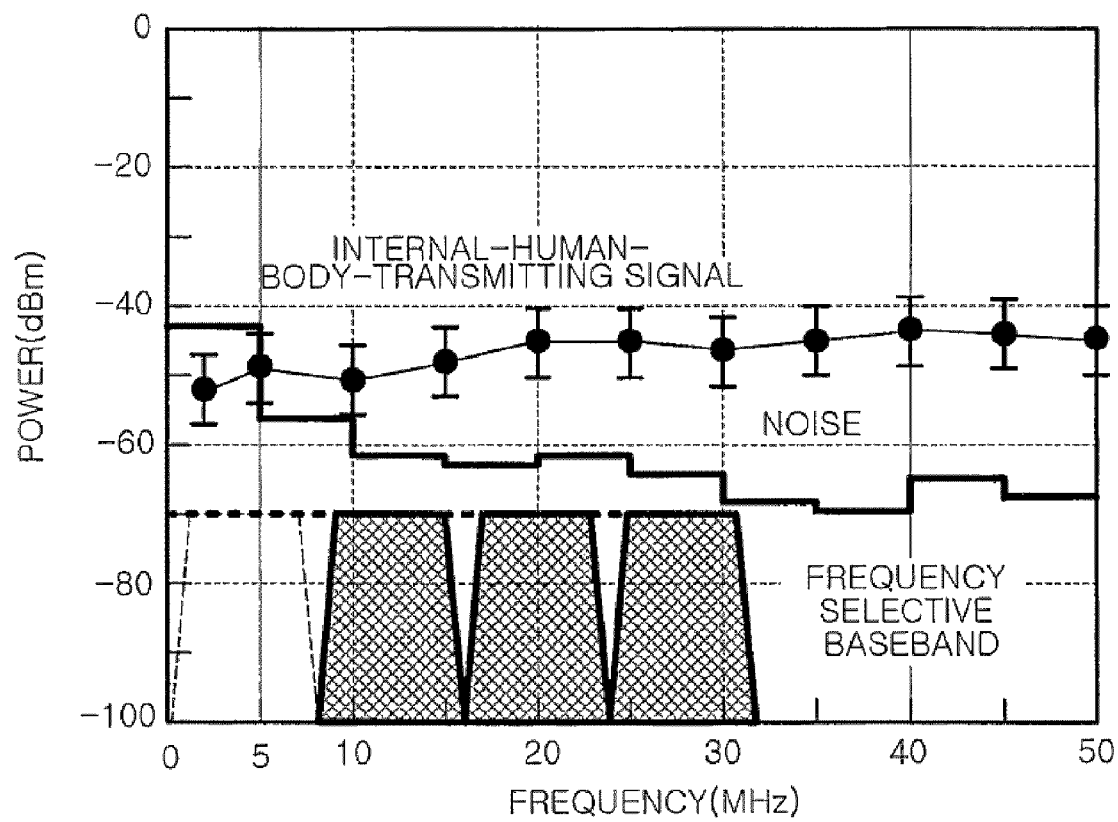
FIG. 1 is a graph illustrating a relationship among a frequency selective baseband for human-body communication, a frequency-varying internal-human-body radiating signal power, and an external-human-body noise power.

Hereinafter, embodiments of the present invention will be described in detail with reference to the accompanying drawings so that the ordinarily skilled in the art can easily implement the embodiments. However, in the detailed description of operational principles of the embodiments of the present invention, detailed description of well-known construction and operations will be omitted for clarifying the present invention.

In addition, in the drawings, elements having similar functions and operations are denoted by the same reference numerals.

The modulation and demodulation methods and apparatuses using a frequency selective baseband according to the present invention can be adapted to a digital communication system, particularly, a human-body communication system. Hereinafter, for the convenience of description, the human-body communication system will be exemplified.

FIG. 1 is a graph illustrating a relationship among a frequency selective baseband for human-body communication, a frequency-varying internal-human-body radiating signal power, and an external-human-body noise power.

The graph of FIG. 1 illustrates results of measurement of interference signals induced into a human body in various measurement positions.

As shown in FIG. 1, in the human-body communication according to the embodiment of the present invention, a frequency selective baseband within a frequency band of 5 MHz to 40 MHz excluding a frequency band of DC to 5 MHz where the largest noise power occurs and a frequency band of 40 MHz or more where an external-human-body radiating signal power is larger than an internal-human-body transmitting signal power.

In the present invention, a frequency selective baseband transmission scheme denotes a transmission scheme where an analog transceiver can obtain a desired frequency band and a processing gain during baseband transmission by only "the spread codes or orthogonal codes having the best frequency characteristics in a user's desired frequency band" among all the spread codes or orthogonal codes used for obtaining a processing gain of data.

FIG. 1 exemplifies a case of using the spread codes for frequency selection. As an example, 64 Walsh codes are used as the spread codes. The 64 Walsh codes obtained by dividing a frequency band of 0 to 32 MHz by 64 are sequentially and uniformly distributed with the most dominant frequency. The 64 Walsh codes are divided into 4 subgroups of the Walsh codes. The first subgroup using a frequency band of DC to 5 MHz having the largest noise power is excluded, and the remaining 3 subgroups using the other frequency bands are selected, so that the frequency selective baseband transmission using a desired frequency band can be performed.

FIG. 2 is a view illustrating subgroups of the 64 Walsh codes according to the embodiment of the present invention.

As shown in FIG. 2, the 64 Walsh codes are used for the spread codes according to the embodiment of the present invention. The 64 Walsh codes may be divided into 4 subgroups having 16 Walsh codes. As a result, subgroup 0, subgroup 1, subgroup 2, and subgroup 3 include 16 Walsh codes $W_0$ to $W_{15}$, 16 Walsh codes $W_{16}$ to $W_{31}$, 16 Walsh codes $W_{32}$ to $W_{47}$, and 16 Walsh codes $W_{48}$ to $W_{63}$, respectively.

On the other hand, the 64 Walsh codes $W_0$ to $W_{63}$ can be used to exactly divide a using frequency band into 64 frequency bands, so that most dominant frequencies fd of the Walsh codes can be sequentially mapped to the divided frequency bands.

For example, in a case where a spreading frequency band including the entire Walsh codes is assumed to be 32 MHz, an interval of the most dominant frequency fd of one Walsh code is 0.5 MHz (=32 MHz/64). Therefore, the most dominant frequencies fd of the Walsh codes $W_1$, $W_{48}$, and $W_{63}$ have 1 MHz, 24.5 MHz, and 32 MHz, respectively, In the embodiment of the present invention shown in FIG. 1, the subgroup 1 ($W_{16}$ to $W_{31}$), the subgroup 2 ($W_{32}$ to $W_{47}$), and the subgroup 3 ($W_{48}$ to $W_{63}$) excluding the subgroup 0 are selected, so that the Walsh codes having the most dominant frequencies fd in a frequency band of 8.5 MHz to 32 MHz among the entire frequency band of 0 to 32 MHz are used.

Now, modulation and demodulation methods and apparatuses using the aforementioned Walsh codes and a frequency selective baseband transmission scheme will be described in detail.

In the modulation and demodulation methods and apparatuses using the frequency selective baseband according to the embodiment of the present invention, the 64 Walsh codes are used as the spread codes, and the human-body communication frequency band shown in FIG. 1 is used as the frequency band. In addition, the subgroup 1 ($W_{16}$ to $W_{31}$), the subgroup 2 ($W_{32}$ to $W_{47}$), and the subgroup 3 ($W_{48}$ to $W_{63}$) excluding the subgroup 0 are selected among the 4 subgroups shown in FIG. 2, so that the 48 Walsh codes among the entire 64 Walsh codes are selectively used.

Figure 3:
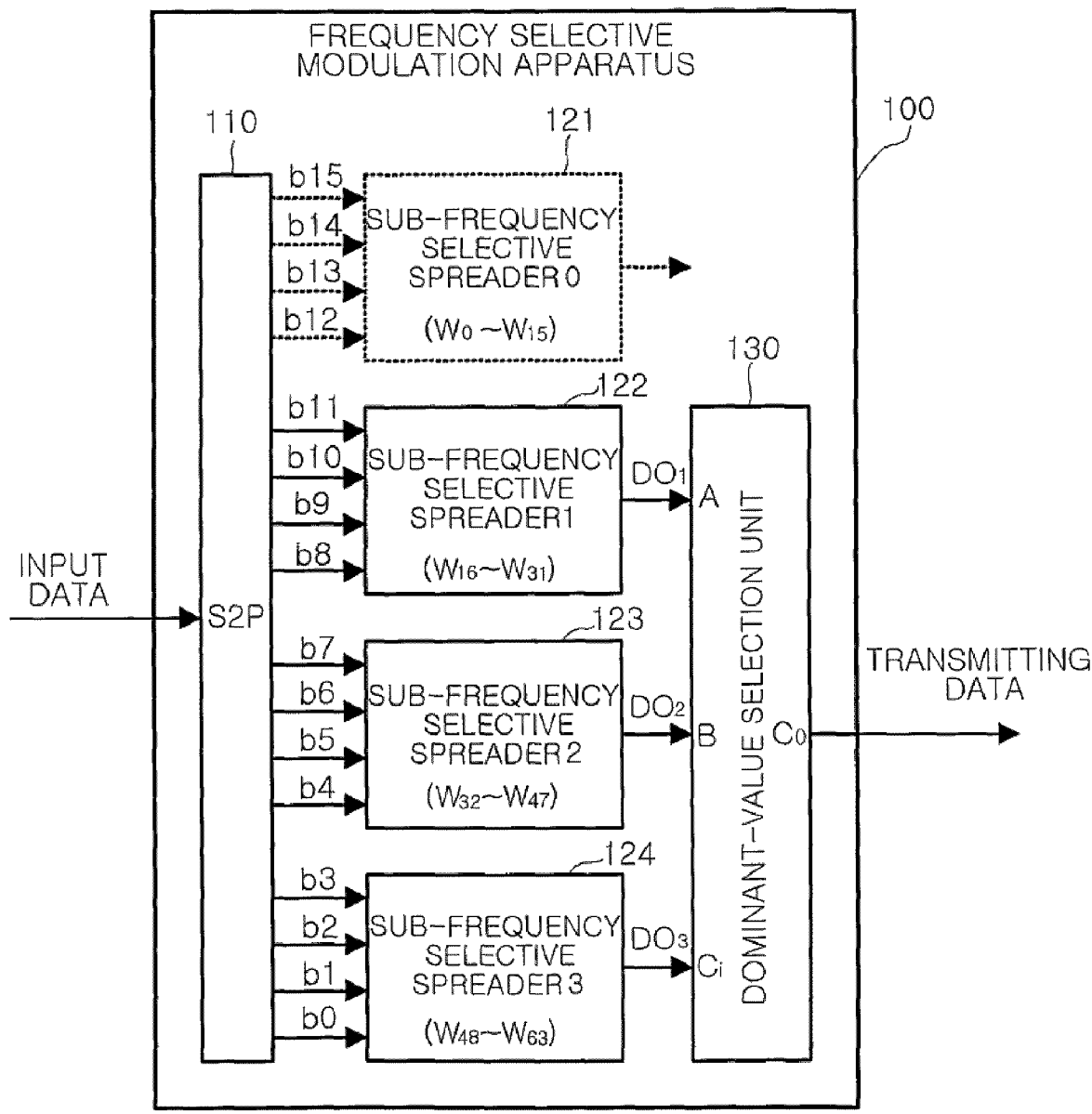
FIG. 3 is a view illustrating a configuration of a frequency selective modulation apparatus according to an embodiment of the present invention.

FIG. 3 is a view illustrating a configuration of a frequency selective modulation apparatus according to an embodiment of the present invention.

Referring to FIG. 3, the frequency selective modulation apparatus 100 includes a serial-to-parallel conversion unit (hereinafter, referred to 'S2P') 110, a plurality of sub-frequency selective spreaders 121 to 124, and a dominant-value selection unit 130.

In the frequency selective modulation apparatus 100, the S2P 110 converts an inputted serial data to 12-bit parallel data and outputs a group of 4 bits of the converted parallel data to each of the sub-frequency selective spreaders.

As an example, when the S2P 110 is inputted with a bit sequence of to-be-transmitted data at a transmission rate of 12 Mbps, the S2P 110 converts the bit sequence to 12-bit parallel data b11 to b0 and outputs the converted parallel data at a transmission rate of 1 Mbps.

On the other hand, since the Walsh codes for a frequency band having the large noise power are used, the sub-frequency selective spreader 0 (121) is not used. The sub-frequency selective spreader 1 (122) is inputted with 4 bits b11 to b8 among outputs of the S2P 110 and selects one Walsh code among the Walsh codes $W_{16}$ to $W_{31}$ to output a bit DO1 at a transmission rate of 64 Mbps.

The sub-frequency selective spreader 2 123 is input with 4 bits b7 to b4 among outputs of the S2P 110 and selects one Walsh code among the Walsh codes $W_{32}$ to $W_{47}$ to output a bit DO2 at a transmission rate of 64 Mbps. The sub-frequency selective spreader 3 124 is inputted with 4 bits b3 to b0 among outputs of the S2P 110 and selects one Walsh code among the Walsh codes $W_{48}$ to $W_{63}$ to output a bit DO3 at a transmission rate of 64 Mbps.

The dominant-value selection unit 130 is inputted as A, B, and Ci (Carry-in) with the 3 bits DO1, DO2, and DO3 outputted from the sub-frequency selective spreaders 122 to 124, respectively, and calculates Co (Carry-out) as a final output of the corresponding frequency selective modulation apparatus 100 by using the following Equation 1.

$$Co=(A \text{ and } B) \text{ or } (B \text{ and } Ci) \text{ or } (Ci \text{ and } A) \quad \text{[Equation 1]}$$

In Equation 1, operators "or" and "and" denote an OR gate and an AND gate, respectively.

Therefore, due to the aforementioned configuration and operations, the frequency selective modulation apparatus 100 can increase the transmission data rate by using serial-to-parallel conversion, the frequency selective baseband transmission scheme, and the limited number of spread codes.

On the other hand, in order to further increase the transmission data rate, in the frequency selective modulation apparatus 100, the S2P 110 may be constructed with 13 bits (with 1 bit added), and a value obtained by performing an XOR operation on the output value of the dominant-value selection unit 130 and the added 1 bit may be generated as a final output value of the frequency selective modulation apparatus 100.

Figure 4:
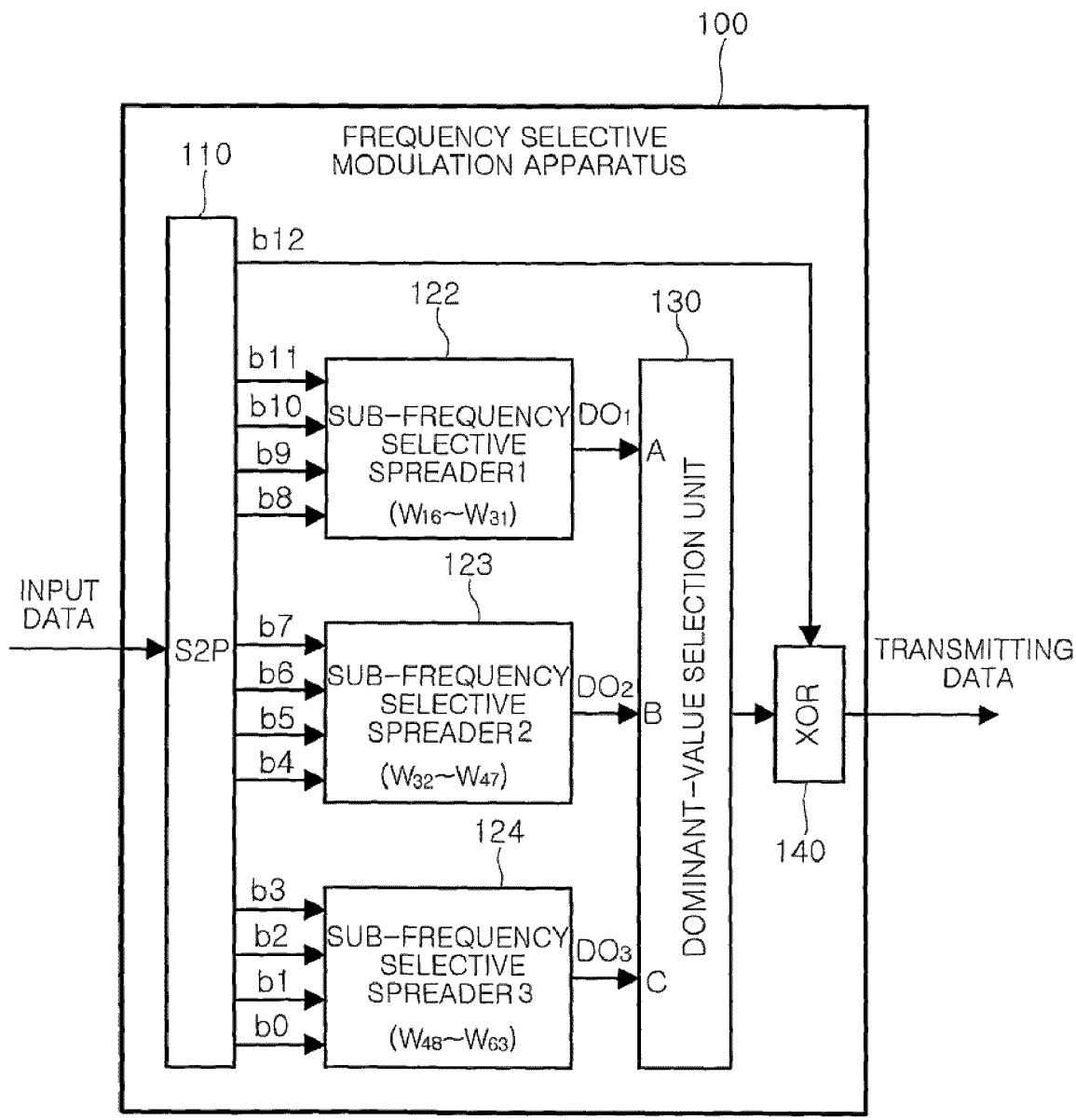
FIG. 4 is a view illustrating a configuration of a frequency selective modulation apparatus according to another embodiment of the present invention.

FIG. 4 is a view illustrating a configuration of a frequency selective modulation apparatus 100 according to another embodiment of the present invention.

As shown in FIG. 4, the frequency selective modulation apparatus 100 according to another embodiment of the present invention may include an S2P 110, a plurality of sub-frequency selective spreaders 122 to 124, a dominant-value selection unit 130, and XOR logic circuit 140.

In the frequency selective modulation apparatus 100 having such a configuration, the S2P 110 is inputted with a serial data bit sequence at a transmission rate of 13 Mbps and converts the serial data bit sequence to 13-bit parallel data b12 to b0 to output the 13-bit parallel data at a transmission rate of 1 Mbps.

In addition, as shown in FIG. 3, in the frequency selective modulation apparatus 100, the subgroup 0 including the Walsh codes in a frequency band having the large noise power is not used, and the sub-frequency selective spreaders 1, 2, 3 (122 to 124) are inputted with the bits b11 to b8, b7 to b4, and b3 to b0 among the outputs of the S2P 110, respectively. Therefore, each of the sub-frequency selective spreaders 1, 2, and 3 (122 to 124) selects one Walsh code included in each of the subgroups 1, 2, and 3 to output the bits DO1, DO2, and DO3 at a transmission rate of 64 Mbps, respectively.

Next, in the frequency selective modulation apparatus 100, the bits DO1, DO2, and DO3 are inputted as input values A, B, and Ci to the dominant-value selection unit 130, and the dominant-value selection unit 130 calculates the output value Co by using Equation 1 and inputs the output value Co to the XOR logic circuit 140.

The XOR logic circuit 140 performs an XOR operation on the output value Co of the dominant-value selection unit 130 and the output b12 of the S2P 110 to generate the resulting value of the XOR operation as a final output value of the frequency selective modulation apparatus 100.

Now, the sub-frequency selective spreaders included in the frequency selective modulation apparatus 100 will be described in brief.

Figure 5:
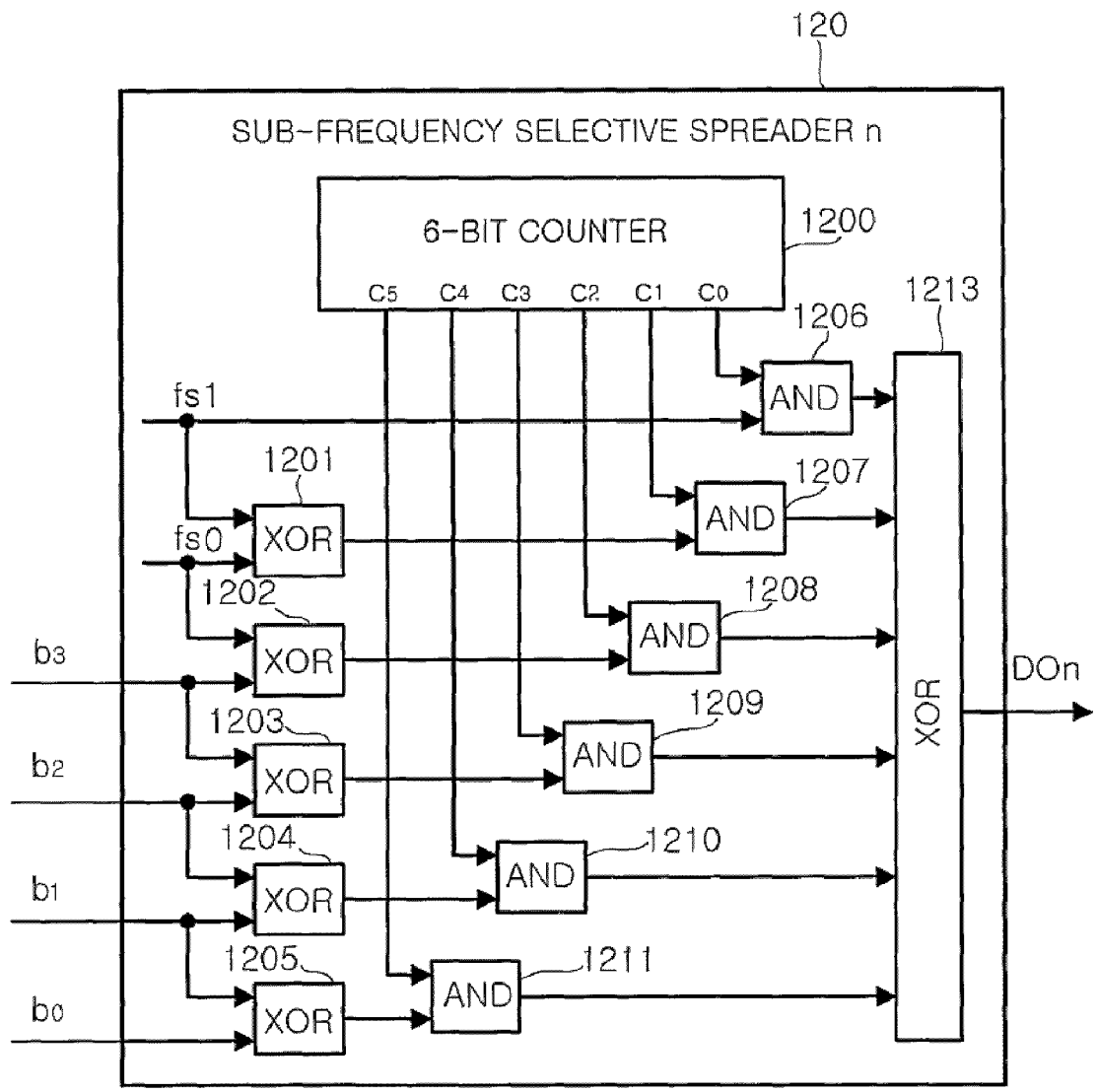
FIG. 5 is a view illustrating a configuration of a sub-frequency selective spreader according to an embodiment of the present invention.

FIG. 5 is a view illustrating a configuration of a sub-frequency selective spreader 120 according to an embodiment of the present invention.

Referring to FIG. 5, the sub-frequency selective spreader 120 includes a 6-bit counter 1200 which is driven with a 64 MHz clock, 5 XOR logic circuits 1201 to 1205 for gray indexing using 2-bit frequency selection control bits fs1 and fs0 and least significant 4 data input bits b3, b2, b1, and b0, 6 AND logic circuits 1206 to 1211, and an XOR logic circuit 1213 for performing an XOR operation on outputs of the AND logic circuits.

The two frequency selection control bits fs1 and fs0 are set to be different among the subgroups. For example, the two frequency selection control bits fs1 and fs0 of the sub-frequency selective spreader 1 (122) for the subgroup 1 ($W_{16}$ to $W_{31}$) are set to 0 and 1, respectively. The two frequency selection control bits fs1 and fs0 of the sub-frequency selective spreader 2 (123) for the subgroup 2 ($W_{32}$ to $W_{47}$) are set to 1 and 0, respectively. The two frequency selection control bits fs1 and fs0 of the sub-frequency selective spreader 3 (124) for the subgroup 3 ($W_{48}$ to $W_{63}$) are set to 1 and 1, respectively.

The 6 AND logic circuits 1206 to 1211 are inputted with outputs C5 to C0 of the 6-bit counter 1200, the most significant bit fs1 among the frequency selection control bits, and output bits of the 5 XOR logic circuits 1201 to 1205 and performs AND operations thereon to output the resulting value of the AND operation thereof, respectively.

Finally, the sub-frequency selective spreader 120 generates an output DOn by using the following Equation 2 and output the output DOn.

$$DOn = (fs1 \text{ and } C0) \text{ xor } [(fs1 \text{ xor } fs0) \text{ and } C1] \text{ xor} [(fs0 \text{ xor } b3) \text{ and } C2] \text{ xor } [(b3 \text{ xor } b2) \text{ and } C3] \text{ xor} [(b2 \text{ xor } b1) \text{ and } C4] \text{ xor } [(b1 \text{ xor } b0) \text{ and } C5] \quad \text{[Equation 2]}$$

Figure 6:
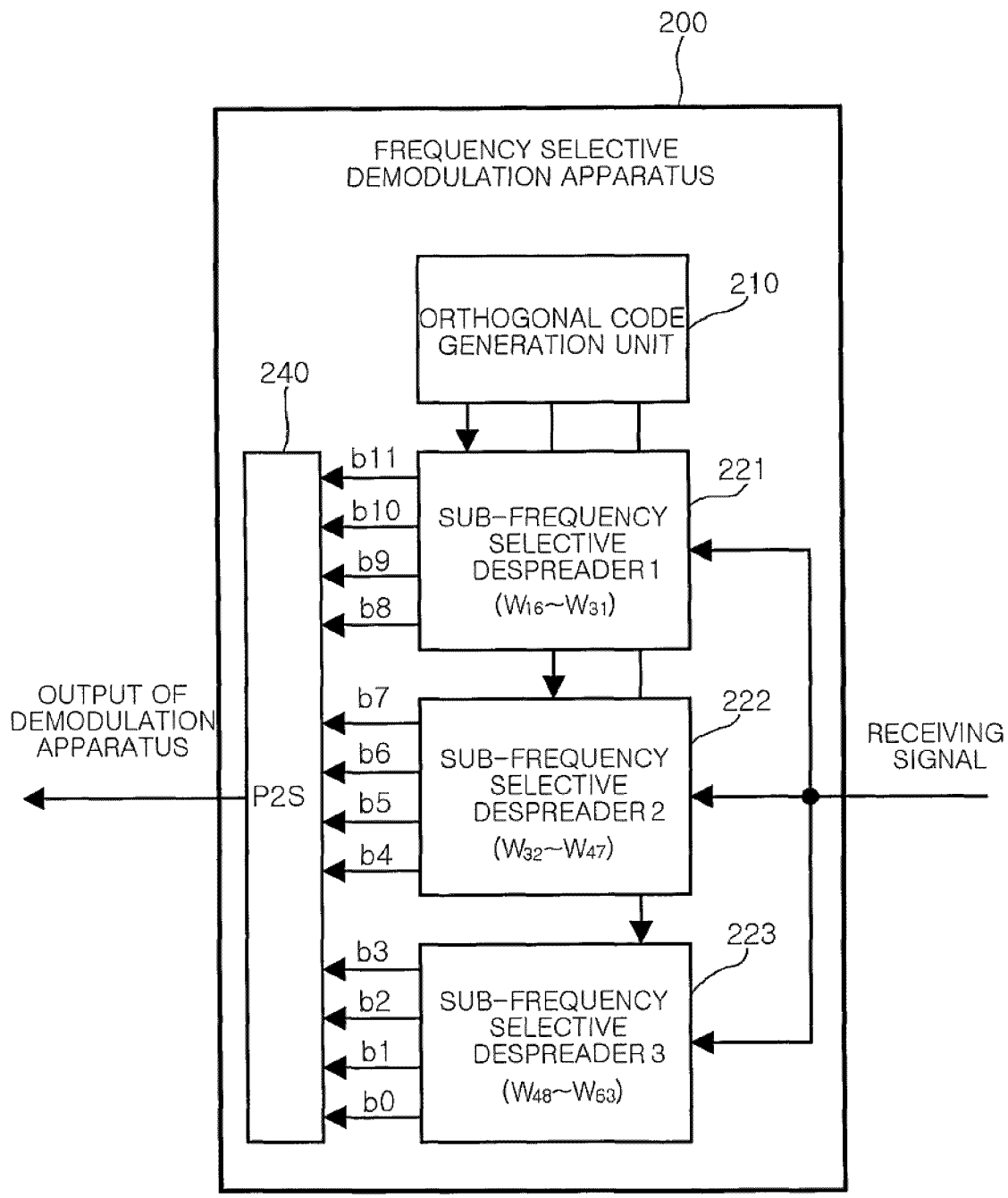
FIG. 6 is a view illustrating a configuration of a frequency selective demodulation apparatus according to an embodiment of the present invention.

FIG. 6 is a view illustrating a configuration of a frequency selective demodulation apparatus 200 according to an embodiment of the present invention.

Referring to FIG. 6, the frequency selective demodulation apparatus 200 may include an orthogonal code generation unit 210, 3 sub-frequency selective despreaders 221 to 223, and a parallel-to-serial conversion unit (hereinafter, referred to as P2S) 240.

In FIG. 6, a receiving signal of the frequency selective demodulation apparatus 200 is assumed to be a receiving signal of which frame synchronization and timing synchronization are acquired by a receiving-signal synchronization unit (not shown) disposed at a front stage thereof.

The orthogonal code generation unit 210 generates 48 Walsh codes synchronized with the acquired frame synchronization and timing synchronization and outputs the 48 Walsh codes to the sub-frequency selective despreaders 221 to 223. Particularly, the orthogonal code generation unit 210 can output the Walsh codes $W_{16}$ to $W_{31}$ of the subgroup 1, the Walsh codes $W_{32}$ to $W_{47}$ of the subgroup 2, and the Walsh codes $W_{48}$ to $W_{63}$ of the subgroup 3 to the sub-frequency selective despreaders 1 (221), 2 (222), and 3 (223), respectively.

Each of the sub-frequency selective despreaders 221 to 223 is inputted with the synchronized receiving signal at a transmission rate of 64 Mbps and calculates a correlation value between the receiving signal and the Walsh codes provided from the orthogonal code generation unit 210. Each of the sub-frequency selective despreaders 221 to 223 detects Walsh codes used for modulation by using the correlation value and outputs a 4-bit index value of the detected Walsh code at a transmission rate of 1 Mbps.

Now, the sub-frequency selective despreaders 221 to 223 will be described in detail. Firstly, the sub-frequency selective despreader 1 (221) calculates the correlation value between the receiving signal and the 16 Walsh codes $W_{16}$ to $W_{31}$ provided from the orthogonal code generation unit 210. The sub-frequency selective despreader 1 (221) detects the Walsh code (one of the Walsh codes $W_{16}$ to $W_{31}$) used for modulation by using the correlation value and outputs a 4-bit parallel index value b11 to b8 at a transmission rate of 1 Mbps.

The sub-frequency selective despreader 2 (222) calculates the correlation value between the receiving signal and the 16 Walsh codes $W_{32}$ to $W_{47}$ provided from the orthogonal code generation unit 210. The sub-frequency selective despreader 2 (222) detects the Walsh code (one of the Walsh codes $W_{32}$ to $W_{47}$) used for modulation by using the correlation value and outputs a 4-bit parallel index value b7 to b4. The sub-frequency selective despreader 3 (223) calculates the correlation value between the receiving signal and the 16 Walsh codes $W_{48}$ to $W_{63}$ provided from the orthogonal code generation unit 210. The sub-frequency selective despreader 3 (223) detects the Walsh code (one of the Walsh codes $W_{48}$ to $W_{63}$) used for modulation by using the correlation value and outputs a 4-bit parallel index value b3 to b0.

The P2S 240 is inputted with 12 bits b11 to b0 from the sub-frequency selective despreaders 221 to 223 and converts the 12 bits to a 1-bit output of the frequency selective demodulation apparatus 200 having a transmission rate of 12 Mbps.

In addition, the frequency selective demodulation apparatus 200 may perform a demodulation function corresponding to the frequency selective modulation apparatus 100 of FIG. 4 in order to further increase the transmission data rate.

Figure 7:
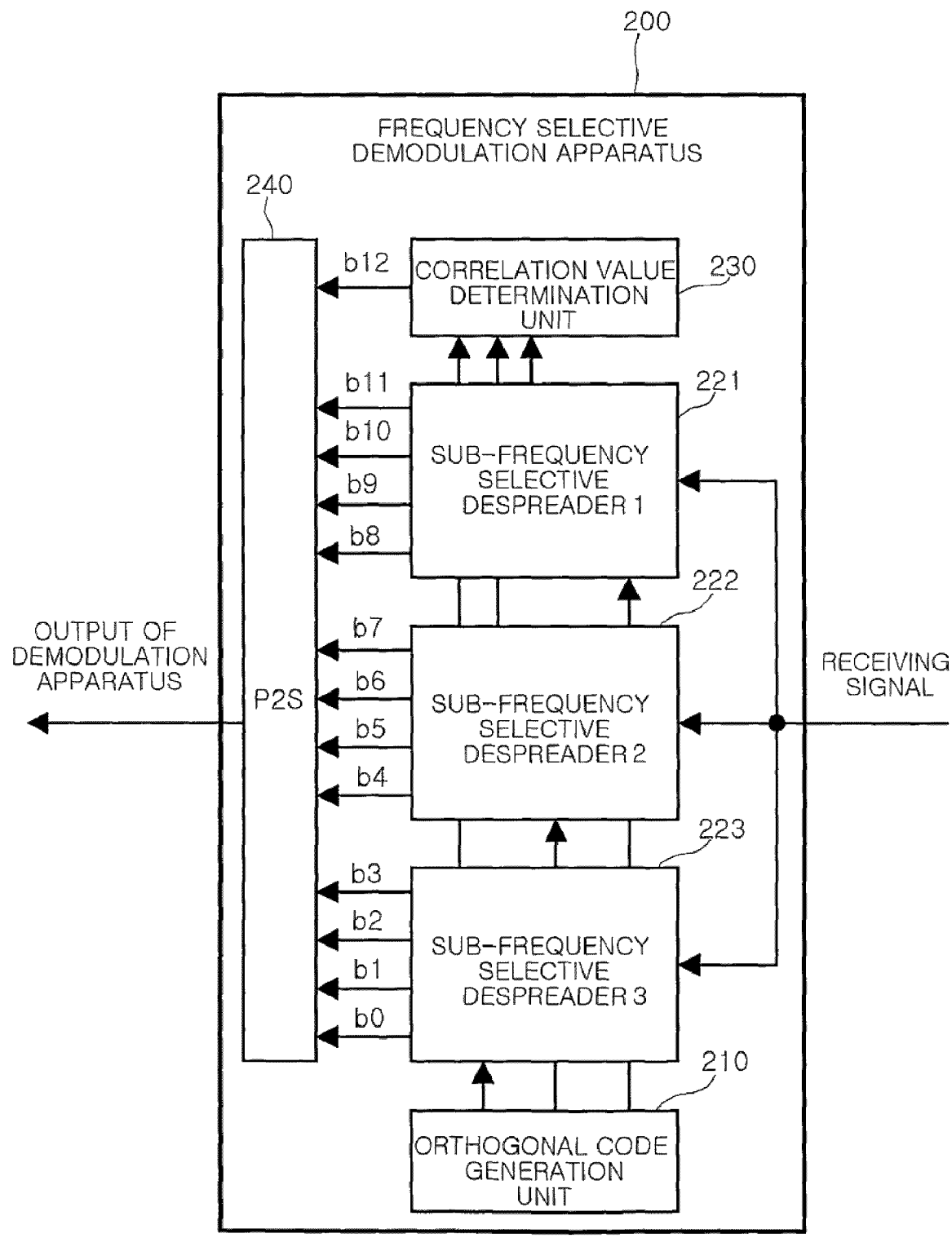
FIG. 7 is a view illustrating a configuration of a frequency selective demodulation apparatus according to another embodiment of the present invention.

FIG. 7 is a view illustrating a configuration of a frequency selective demodulation apparatus 200 according to another embodiment of the present invention.

Referring to FIG. 7, the frequency selective demodulation apparatus 200 according to another embodiment of the present invention may include a orthogonal code generation unit 210, 3 sub-frequency selective despreaders 221 to 223, a correlation value determination unit 230, and a P2S 240.

Similarly to FIG. 6, in FIG. 7, a receiving signal of the frequency selective demodulation apparatus 200 is assumed to be a receiving signal of which frame synchronization and timing synchronization are acquired by the receiving-signal synchronization unit disposed at a front stage thereof.

The orthogonal code generation unit 210 generates 48 Walsh codes synchronized according to the acquired frame synchronization and timing synchronization and outputs the Walsh codes $W_{16}$ to $W_{31}$ of the subgroup 1, the Walsh codes $W_{32}$ to $W_{47}$ of the subgroup 2, and the Walsh codes $W_{48}$ to $W_{63}$ of the subgroup 3 to the sub-frequency selective despreaders 1 (221), 2 (222), and 3 (223), respectively.

Each of the sub-frequency selective despreaders 221 to 223 is inputted with the synchronized receiving signal at a transmission rate of 64 Mbps and calculates a correlation value between the receiving signal and the Walsh codes provided from the orthogonal code generation unit 210. Each of the sub-frequency selective despreaders 221 to 223 detects Walsh codes used for modulation by using the correlation value and outputs a 4-bit index value of the detected Walsh code at a transmission rate of 1 Mbps.

The sub-frequency selective despreaders 1 (221), 2 (222), and 3 (223) calculate the corresponding correlation value between the receiving signal and the Walsh codes of the subgroups 1, 2, and 3, respectively. The sub-frequency selective despreaders 1 (221), 2 (222), and 3 (223) detect the corresponding Walsh codes used for modulation by using the corresponding correlation values and output 4-bit parallel index values b11 to b8, b7 to b4, and b3 to b0 at a transmission rate of 1 Mbps, respectively.

The sub-frequency selective despreaders 221 to 223 finally select the index values and provide correlation values of the finally-selected index values to the correlation value determination unit 230.

The correlation value determination unit 230 outputs to the P2S 240 the bit b12 at a transmission rate of 1Mbps according to the correlation values provided from the sub-frequency selective despreaders 221 to 223.

For example, in a case where there is no noise-originated error in a transmission channel, if the bit b12 is 0 in a transmitting stage, that is, the frequency selective modulation apparatus 100 according to another embodiment of the present invention, all the correlation values of the finally-selected index values of the sub-frequency selective despreaders 221 to 223 may be 16, and remaining index values may be 32. If the bit b12 is 1 at the transmitting stage, all the correlation values of the finally-selected index values of the sub-frequency selective despreaders 221 to 223 may be 48, and remaining index values may be 32.

Therefore, if the sub-frequency selective despreaders 221 to 223 provide the correlation values of 16, the correlation value determination unit 230 outputs the bit b12 of 0 to the P2S 240. If the sub-frequency selective despreaders 221 to 223 provide the correlation values of 48, the correlation value determination unit 230 outputs the bit b12 of 1 to the P2S 240.

The P2S 240 converts the parallel data b12 to b0 (inputted from the sub-frequency selective despreaders 221 to 223 and the correlation value determination unit 230) to 1-bit serial data having a transmission rate of 13 Mbps and outputs the 1-bit serial data as a final value to the corresponding frequency selective demodulation apparatus 200.

Now, a human-body communication system, that is, a digital communication system employing the frequency selective modulation and demodulation apparatuses using a frequency selective baseband will be described in detail.

Figure 8:
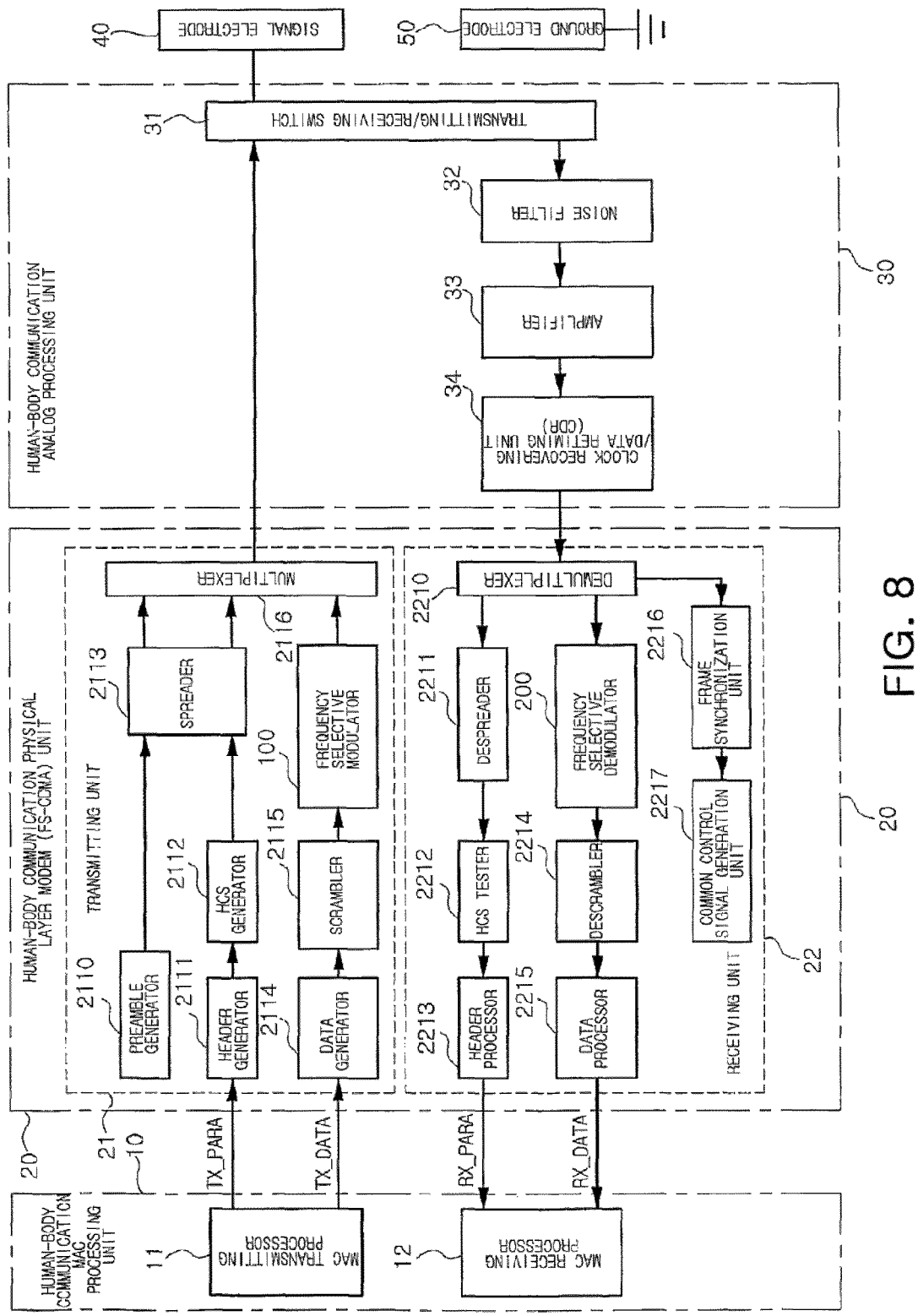
FIG. 8 is a view illustrating a configuration of a human-body communication system using a frequency selective baseband according to an embodiment of the present invention.

FIG. 8 is a view illustrating a configuration of a human-body communication system using a frequency selective baseband according to an embodiment of the present invention.

Referring to FIG. 8, the human-body communication system may include a MAC processing unit 10, a physical layer modem unit 20, an analog processing unit 30, a signal electrode 40, and a ground electrode 50.

In the human-body communication system, the human-body communication MAC processing unit 10 includes a MAC transmitting processor 11 and a MAC receiving processor 12. The human-body communication MAC processing unit 10 transfers to-be-transmitted data and data information (transmission rate, modulation scheme, user ID, data length, etc) received from an upper layer to a transmitting unit 21 of a physical layer modem unit 20. In addition, the human-body communication MAC processing unit 10 transfers data and data information received from the physical layer modem unit 20 to the upper layer.

The physical layer modem unit 20 includes the transmitting unit 21 and a receiving unit 22. The transmitting unit 21 mainly includes a preamble/header transmitting processing unit (2110, 2111, 2112, 2113), a data transmitting processing unit (2114, 2115, 100), and a multiplexer 2116.

The preamble/header transmitting processing unit (2110, 2111, 2112, 2113) has functions of spreading a preamble and header information for frame synchronization. The preamble/header transmitting processing unit (2110, 2111, 2112, 2113) includes a preamble generator 2110, a header generator 2111, an HCS generator 2112, and spreader 2113. The data transmitting processing unit (2114, 2115, 100) has functions of spreading data (that is to be transmitted through human-body communication) into spread codes having the best frequency characteristics in a user's desired frequency band, that is, the frequency selective spread codes. The data transmitting processing unit (2114, 2115, 100) includes a data generator 2114, a scrambler 2115, and a frequency selective modulator 100.

In particular, the frequency selective modulator 100 of the data transmitting processing unit (2114, 2115, 100) modulates 12 Mbps or 13 Mbps serial data (scrambled by the data generator 2114 and the scrambler 2115) to transmitting data using the serial-to-parallel conversion, the frequency selective baseband transmission scheme, and the limited number of spread codes according to the configuration and operations shown in FIG. 3 or 4 of the aforementioned embodiments.

The multiplexer 2116 multiplexes the preamble and the header generated through the spreading of the preamble/header transmitting processing unit (2110, 2111, 2112, 2113) and the frequency-selective-modulated data outputted from the data transmitting processing unit (2114, 2115, 100) to transmit a digital signal.

Accordingly, the digital signal transmitted from the multiplexer 2116 of the transmitting unit 21 can be adapted to the baseband transmission of the frequency selective modulator 100, so that the digital signal can be transmitted through a transmitting/receiving switch 31 and the signal electrode 40 into a human body without separate configurations for analog transmitting processes. The ground electrode 50 is disposed to provide a reference voltage.

The analog processing unit 30 is divided to a portion for transmitting the digital signal of the transmitting unit 21 into the human body, that is, the transmitting/receiving switch 31 and the signal electrode 40 and a portion for receiving the digital signal from the human body and transferring the receiving unit 22 of the physical layer modem unit 20, that is, the ground electrode 50, the transmitting/receiving switch 31, a noise filter 32, an amplifier 33, and a clock recovering/data retiming unit (CDR) 34.

In the analog processing unit 30 having the aforementioned configuration, noise of the receiving signal (inputted through the signal electrode 40) that is originated from the internal-human-body transmission is removed through the transmitting/receiving switch 31 and the noise filter 32, the receiving signal is amplified to have a desired signal amplitude by the amplifier 33, and timing synchronization and frequency offset of the receiving signal are compensated based on a clock of a receiving stage by the clock recovering/data retiming unit 34.

The receiving signal of which timing synchronization and frequency offset are compensated is outputted to the receiving unit 22 of the physical layer modem unit 20.

The receiving unit 22 of the physical layer modem unit 20 mainly includes a demultiplexer 2210, a header receiving processing unit (2211, 2212, 2213), and a data receiving processing unit (200, 2214, 2215). The receiving unit 22 further includes a frame synchronization unit 2216 and common control signal generation unit 2217 to acquire frame synchronization of the receiving signal and generate common control signals used for the transmitting unit 21 and the receiving unit 22 of the physical layer modem unit.

In the physical layer modem unit 20, the demultiplexer 2210 has functions of extracting a preamble, headers, and data from the digital signal transmitted through the human-body channel. The header receiving processing unit (2211, 2212, 2213) has functions of dispreading the extracted header to recover original data information. The header receiving processing unit (2211, 2212, 2213) includes a despreader 2211, an HCS tester 2212, and a header processor 2213.

The data receiving processing unit (200, 2214, 2215) has functions of despreading the extracted date into spread codes having the best frequency characteristics in a user's desired frequency band. The data receiving processing unit (200, 2214, 2215) includes a frequency selective demodulator 200, a descrambler 2214, and a data processor 2215.

In particular, when data are inputted through the demultiplexer 2210, the frequency selective demodulator 200 of the data receiving processing unit (200, 2214, 2215) acquires correlation values using a frequency selective baseband and spread codes used for transmission and demodulates finally-selected index values into 12 Mbps or 13 Mbps serial data according to the configurations and operations shown in FIG. 6 or 7 of the aforementioned embodiment.

As described above, a human-body communication system according to the embodiment of the present invention is provided with a frequency selective modulator and a frequency selective demodulator to efficiently combine serial-to-parallel conversion of data, a frequency selective baseband, and the limited umber of spread codes, so that it is possible to increase a processing gain of the entire system and to increase a data transmission rate.

While the present invention has been particularly shown and described with reference to exemplary embodiments thereof, it will be understood by those skilled in the art that various changes in form and details may be made therein without departing from the spirit and scope of the present invention as defined by the appended claims.

Particularly, the present invention is described through embodiments using spread codes for frequency selection, but not limited thereto. As alternative embodiments, orthogonal codes may be used for the frequency selection.

The invention claimed is:

1. A frequency modulation method using a frequency selective baseband, comprising:
   generating a plurality of subgroups by dividing 2N (N is a real number) spread codes used for frequency spreading into 2M (M<N, M is a real number) spread codes;
   selecting P(P is a real number) subgroups selected by a user among the generated subgroups;
   acquiring P spread codes by inputting M data bits to each of the selected p subgroups so as for one spread code to be selected among the 2M spread codes of each subgroup; and
   selecting dominant value among the acquired P spread codes and generating transmitting data including the dominant value.

2. The frequency modulation method of claim 1, further comprising converting serial data provided from an upper layer to P*M-bit parallel data, wherein the M parallel data bits are inputted to each of the selected P subgroups.

3. The frequency modulation method of claim 1, further comprising:
   converting serial data provided from an upper layer to (P*M+1)-bit parallel data; and
   generating transmitting data by performing an XOR operation on the dominant value selected from the P spread codes acquired from the subgroups and one bit of the (P*M+1) bits.

4. The frequency modulation method of claim 1, wherein, in the selecting of the dominant value among the acquired P spread codes, an AND operation is performed on groups of two spread codes among the acquired P spread codes, an OR operation is performed on the resulting values of the AND operation, and only the most significant bit is selected from the resulting values of the OR operation for the P spread codes.

5. A frequency demodulation method using a frequency selective baseband, comprising:
   generating a plurality of subgroups by dividing 2N (N is a real number) spread codes used for frequency spreading into 2M (M<N, M is a real number) spread codes;
   when modulated data are transmitted from a transmitting stage, acquiring frame synchronization and timing synchronization from the transmitting data;
   selecting P subgroups used for modulation of the transmitting data among the plurality of subgroups and synchronizing the spread codes of the selected subgroups with the frame synchronization and the timing synchronization;
   calculating correlation values between the spread codes of the P subgroups and the transmitting data and detecting one spread code selected for the modulation from each of the subgroups;
   generating an M-bit index value of the detected spread code of each of the P subgroups to obtain M*P-bit parallel data; and
   converting the M*P-bit parallel data to serial data.

6. The frequency demodulation method of claim 5, further comprising:
   acquiring 1-bit data according to the correlation values of the index values generated the individual P subgroups; and
   obtaining parallel data by adding the acquired 1-bit data and the M*P index values acquired from the P subgroups and converting the parallel data to the serial data.

7. A frequency modulation apparatus using a frequency selective baseband, comprising:
- a plurality of sub-frequency selective spreaders, each including one subgroup among a plurality of subgroups generated by dividing 2N (N is a real number) spread codes used for frequency spreading into 2M (M<N, M is a real number) spread codes, each of the sub-frequency selective spreaders selecting and outputting one spread code among the 2M spread code of the corresponding subgroup when M data bits are inputted;
- a serial-to-parallel conversion unit converting serial data provided from an upper layer to P*M-bit parallel data, outputting the M data bits to each of the P sub-frequency selective spreaders selected among the plurality of sub-frequency selective spreaders;
- a dominant-value selection unit selecting dominant value from P spread codes outputted from the P sub-frequency selective spreaders and generating transmitting data including the dominant value.

8. The frequency modulation apparatus of claim 7, wherein the serial-to-parallel conversion unit converts the serial data provided from the upper layer to (P*M+1)-bit parallel data, outputs M data bits to each of the selected P sub-frequency selective spreaders, and outputs one bit in separation from the P*M bits.

9. The frequency modulation apparatus of claim 8, further comprising an XOR logic circuit performing an XOR operation on the dominant value selected by the dominant-value selection unit and the 1 bit separately outputted from the serial-to-parallel conversion unit so as to increase a transmission data rate.

10. The frequency modulation apparatus of claim 7, wherein the dominant-value selection unit performs an AND operation on groups of two spread codes among the selected P spread codes, performs an OR operation on the resulting values of the AND operations, and selects only the most significant bit from the resulting values of the OR operation for the P spread codes.

11. A frequency demodulation apparatus using a frequency selective baseband, comprising:
- a orthogonal code generator generating a plurality of subgroups by dividing 2N (N is a real number) spread codes used for frequency spreading into 2M (M<N, M is a real number) spread codes, acquiring frame synchronization and timing synchronization from transmitted data when a modulated data is transmitted from a transmitting stage, selecting P subgroups determined to be used for modulation of the transmitted data among the plurality of subgroups, and synchronizing and outputting the spread codes of the P subgroups with the acquired frame synchronization and timing synchronization;
- a plurality of sub-frequency selective despreaders each receiving, in a case where the modulated transmitting data is received from the transmitting stage, 2M spread codes from the orthogonal code generator, calculating correlation values between the provided spread codes and the transmitting data, detecting one spread code determined to be selected for the modulation of the transmitting data, and outputting an M-bit index value of the detected spread code; and
- a parallel-to-serial conversion unit which converting P*M index values of parallel data inputted from the P sub-frequency selective despreaders which are provided with the spread codes of the P subgroups from orthogonal code generator to serial data.

12. The frequency demodulation apparatus of claim 11, further comprising a correlation value determination unit provided with the correlation values of the index values outputted from the P sub-frequency selective despreaders and outputting different 1-bit data according to the provided correlation values.

13. The frequency demodulation apparatus of claim 12, wherein the parallel-to-serial conversion unit converts parallel data obtained by adding the P*M index values and the 1-bit data to the serial data in a case where 1-bit data outputted from the correlation value determination unit together with the P*M-bit parallel data outputted from the sub-frequency selective despreaders are inputted.

* * * * *

UNITED STATES PATENT AND TRADEMARK OFFICE
CERTIFICATE OF CORRECTION

PATENT NO. : 7,961,061 B2
APPLICATION NO. : 12/601584
DATED : June 14, 2011
INVENTOR(S) : In Gi Lim et al.

Page 1 of 1

It is certified that error appears in the above-identified patent and that said Letters Patent is hereby corrected as shown below:

On the Title Page, Abstract (57)
Line 4, '2N', each occurrence should read $-2^N-$.
Lines 5 and 9, '2M', each occurrence should read $-2^M-$.

In the Specification
Column 2, lines 6, 36 and 62, '2N', each occurrence should read $-2^N-$.
Column 2, lines 7, 12, 37, 64 and 65, '2M', each occurrence should read $-2^M-$.
Column 3, line 29, '2N', each occurrence should read $-2^N-$.
Column 3, lines 30 and 40, '2M', each occurrence should read $-2^M-$.
Column 12, lines 4 and 40, '2N', each occurrence should read $-2^N-$.
Column 12, lines 6, 12 and 42, '2M', each occurrence should read $-2^M-$.

In the Claims
Column 13, line 6, '2N', each occurrence should read $-2^N-$.
Column 13, lines 6 and 10, '2M', each occurrence should read $-2^M-$.
Column 14, line 4, '2N', each occurrence should read $-2^N-$.
Column 14, lines 5 and 16, '2M', each occurrence should read $-2^M-$.

Signed and Sealed this
First Day of October, 2013

Teresa Stanek Rea
*Deputy Director of the United States Patent and Trademark Office*